United States Patent
Han et al.

(10) Patent No.: US 11,022,052 B2
(45) Date of Patent: Jun. 1, 2021

(54) VEHICLE POWER OUTPUT CONTROL METHOD, APPARATUS AND SYSTEM

(71) Applicant: Guangzhou Automobile Group Co., Ltd., Guangdong (CN)

(72) Inventors: Lingtao Han, Guangdong (CN); Qiang Ren, Guangdong (CN); Ted S Huang, Guangdong (CN); Wei Xu, Guangdong (CN); Chunyun Zheng, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 16/332,799

(22) PCT Filed: Apr. 26, 2018

(86) PCT No.: PCT/CN2018/084692
§ 371 (c)(1),
(2) Date: Mar. 13, 2019

(87) PCT Pub. No.: WO2018/196828
PCT Pub. Date: Nov. 1, 2018

(65) Prior Publication Data
US 2020/0040826 A1    Feb. 6, 2020

(30) Foreign Application Priority Data

Apr. 27, 2017  (CN) .......................... 201710287971.2

(51) Int. Cl.
*F02D 35/00* (2006.01)
*G06K 9/00* (2006.01)

(52) U.S. Cl.
CPC ......... *F02D 35/00* (2013.01); *G06K 9/00791* (2013.01)

(58) Field of Classification Search
CPC ............ B60W 30/182; B60W 30/188; B60W 2710/0666; B60W 2510/0604;
(Continued)

(56) References Cited

U.S. PATENT DOCUMENTS

| 10,783,723 | B2 * | 9/2020 | Richard ................. B62D 55/32 |
| 2011/0277577 | A1 * | 11/2011 | Roberge ................ B60W 10/06 |
| | | | 74/473.1 |

(Continued)

FOREIGN PATENT DOCUMENTS

| CN | 101553377 A | 10/2009 |
| CN | 103796893 A | 5/2014 |

(Continued)

*Primary Examiner* — Atul Trivedi
(74) *Attorney, Agent, or Firm* — Gang Yu

(57) ABSTRACT

A vehicle power output control method, apparatus and system are provided. The method includes: collecting an image of a road surface on which a vehicle drives currently, and recognizing, according to the image of the road surface, the type of the road surface on which the vehicle drives currently; starting, according to the current type of the road surface, a terrain mode corresponding to an all-terrain adaptive mode; determining, in the terrain mode, a power output strategy corresponding to the current terrain mode; and adjusting an output torque of an engine according to a power output curve corresponding to the current power output strategy, the power output curve being a function curve using a stepping depth of an accelerator pedal as a variable and the output torque of the engine as an output. The method facilitates outputting an adaptive power by an engine when a vehicle drives on different road surfaces.

16 Claims, 2 Drawing Sheets

(58) Field of Classification Search
CPC ...... B60W 40/06; F02D 35/00; F02D 41/021; F02D 41/2422; F02D 11/105; F02D 2200/702; G06K 9/00791
USPC .......................................................... 701/99
See application file for complete search history.

(56) References Cited

U.S. PATENT DOCUMENTS

| | | | | |
|---|---|---|---|---|
| 2011/0301825 A1* | 12/2011 | Grajkowski | .......... | F02D 41/021 701/102 |
| 2014/0244110 A1* | 8/2014 | Tharaldson | ............ | G06Q 50/01 701/36 |
| 2014/0277988 A1* | 9/2014 | Franganillo | ........... | B60W 10/02 701/93 |
| 2015/0073674 A1* | 3/2015 | Kelly | .............. | B60W 30/18172 701/69 |
| 2015/0073679 A1* | 3/2015 | Darnell | ................. | B60W 10/06 701/84 |
| 2015/0203117 A1* | 7/2015 | Kelly | ..................... | B60K 31/02 701/91 |
| 2015/0203123 A1* | 7/2015 | Darnell | ................ | B60W 10/111 701/37 |
| 2015/0217766 A1* | 8/2015 | Kelly | .................. | F16H 61/0213 701/94 |
| 2015/0217768 A1* | 8/2015 | Fairgrieve | ........... | B60W 30/143 701/93 |
| 2016/0121862 A1* | 5/2016 | Richards | .............. | B60G 17/015 701/37 |
| 2016/0244060 A1* | 8/2016 | Fairgrieve | ........... | B60W 30/182 |
| 2016/0280224 A1* | 9/2016 | Tatourian | .............. | G08G 1/0116 |
| 2017/0057515 A1* | 3/2017 | Kelly | .................... | B60W 10/22 |
| 2017/0088135 A1* | 3/2017 | Kelly | .................... | B60W 50/10 |
| 2017/0225564 A1* | 8/2017 | Christensen | ........... | B60K 23/08 |
| 2019/0375407 A1* | 12/2019 | Maleki | .................. | B60W 10/04 |
| 2020/0247395 A1* | 8/2020 | Strandberg | .............. | B60T 8/245 |

FOREIGN PATENT DOCUMENTS

| | | | | |
|---|---|---|---|---|
| CN | 104057954 A | | 9/2014 | |
| CN | 104125906 A | | 10/2014 | |
| CN | 105270263 A | | 1/2016 | |
| CN | 105683016 A | | 6/2016 | |
| CN | 106232449 | | 12/2016 | |
| CN | 107128309 A | | 9/2017 | |
| GB | 2502802 A | | 12/2013 | |
| GB | 2514162 A | * | 11/2014 | ............ B60G 17/015 |
| GB | 2519533 A | * | 4/2015 | .......... B60W 30/143 |
| GB | 2522442 A | * | 7/2015 | .......... B60W 10/184 |
| GB | 201520482 | | 1/2016 | |
| GB | 2537884 A | | 11/2016 | |
| WO | WO-2014027111 A1 | * | 2/2014 | ............. B60T 8/175 |
| WO | WO-2015110203 A1 | * | 7/2015 | ...... B60W 30/18172 |
| WO | WO-2015110644 A1 | * | 7/2015 | ...... B60W 30/18172 |
| WO | 2016079190 A1 | | 5/2016 | |

* cited by examiner

US 11,022,052 B2

VEHICLE POWER OUTPUT CONTROL METHOD, APPARATUS AND SYSTEM

TECHNICAL FIELD

The present disclosure relates to the technical field of vehicle control, and more particularly to a vehicle power output control method, apparatus and system.

BACKGROUND

An all-terrain adaptive mode is a vehicle control mode proposed in recent years, generally applied to off-road vehicles, and mainly implemented by a dedicated all-terrain controller. In the all-terrain adaptive mode, a variety of gear settings are generally provided, such as common, grass-gravel-snow, mud and rutting, sand, and rock modes. The all-terrain controller controls specific adjustment on an engine, a brake system and a vehicle suspension in different modes by the cooperation of an engine control system and an Electronic Stability Program (ESP) system, so as to Improve the performance.

The all-terrain adaptive mode is an emerging technology, and its adaptation to terrain is currently unsatisfactory. Especially when a four-wheel vehicle drives on road surfaces of different terrains, such as urban roads, snow, mud, or sand, due to the complicated road conditions, the traditional four-wheel vehicle is difficult to drive under all terrains at its best in the existing all-terrain adaptive mode.

SUMMARY

In view of this, the embodiments of the present disclosure provide a vehicle power output control method, apparatus and system, facilitating outputting an adaptive power by an engine when a vehicle drives on different road surfaces.

According to an embodiment the present disclosure, a vehicle power output control method is provided, which may include the following steps: An image of a road surface on which a vehicle drives currently is collected, and the type of the road surface on which the vehicle drives currently is recognized according to the image of the road surface.

A terrain mode corresponding to an all-terrain adaptive mode is started according to the current type of the road surface, and a power output strategy corresponding to the current terrain mode is determined according to a correspondence between a terrain mode and a preset power output strategy, the terrain mode in the all-terrain adaptive mode including at least two of a common terrain mode, a snow mode, a mud mode, and a sand mode.

An output torque of an engine is adjusted according to a power output curve corresponding to the current power output strategy, wherein the power output curve is a function curve using a stepping depth of an accelerator pedal as a variable and the output torque of the engine as an output.

According to an embodiment of the present disclosure, a vehicle power output control apparatus is also provided, which may include:

a road surface recognition module, configured to collect an image of a road surface on which a vehicle drives currently, and recognize the type of the road surface on which the vehicle drives currently according to the image of the road surface;

a power output strategy determining module, configured to start a terrain mode corresponding to an all-terrain adaptive mode according to the current type of the road surface, and determine a power output strategy corresponding to the current terrain mode according to a correspondence between a terrain mode and a preset power output strategy, the terrain mode in the all-terrain adaptive mode including at least two of a common terrain mode, a snow mode, a mud mode, and a sand mode; and a power output control module, configured to adjust an output torque of an engine according to a power output curve corresponding to the current power output strategy, the power output curve being a function curve using a stepping depth of an accelerator pedal as a variable and the output torque of the engine as an output.

According to an embodiment of the present disclosure, a vehicle power output control system is also provided, which may include: a road surface recognition apparatus, an all-terrain controller and an engine control apparatus.

The road surface recognition apparatus is configured to collect an image of a road surface on which a vehicle drives currently, recognize the type of the road surface on which the vehicle drives currently according to the image of the road surface, and send the type of the road surface to the all-terrain controller.

The all-terrain controller is configured to start a terrain mode corresponding to an all-terrain adaptive mode according to the current type of the road surface, determine a power output strategy corresponding to the current terrain mode according to a correspondence between a terrain mode and a preset power output strategy, and send the power output strategy to the engine control apparatus, the terrain mode in the all-terrain adaptive mode including at least two of a common terrain mode, a snow mode, a mud mode, and a sand mode.

The engine control apparatus is configured to adjust an output torque of an engine according to a power output curve corresponding to the current power output strategy, the power output curve being a function curve using a stepping depth of an accelerator pedal as a variable and the output torque of the engine as an output.

According to the above embodiments, an image of a road surface on which a vehicle drives currently is collected in real time or periodically, and the type of the road surface on which the vehicle drives currently is recognized according to the image of the road surface; a terrain mode corresponding to an all-terrain adaptive mode is automatically started; a power output strategy corresponding to the current terrain mode is determined in the terrain mode according to a correspondence between a terrain mode and a preset power output strategy; and an output torque of an engine is adjusted according to a power output curve corresponding to the current power output strategy, the power output curve being a function curve using a stepping depth of an accelerator pedal as a variable and the output torque of the engine as an output. Thus, a power adaptive to a current terrain can be obtained when a vehicle drives on different road surfaces, thereby ensuring that the vehicle can drive on different road surfaces at its best.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

Figure 1:
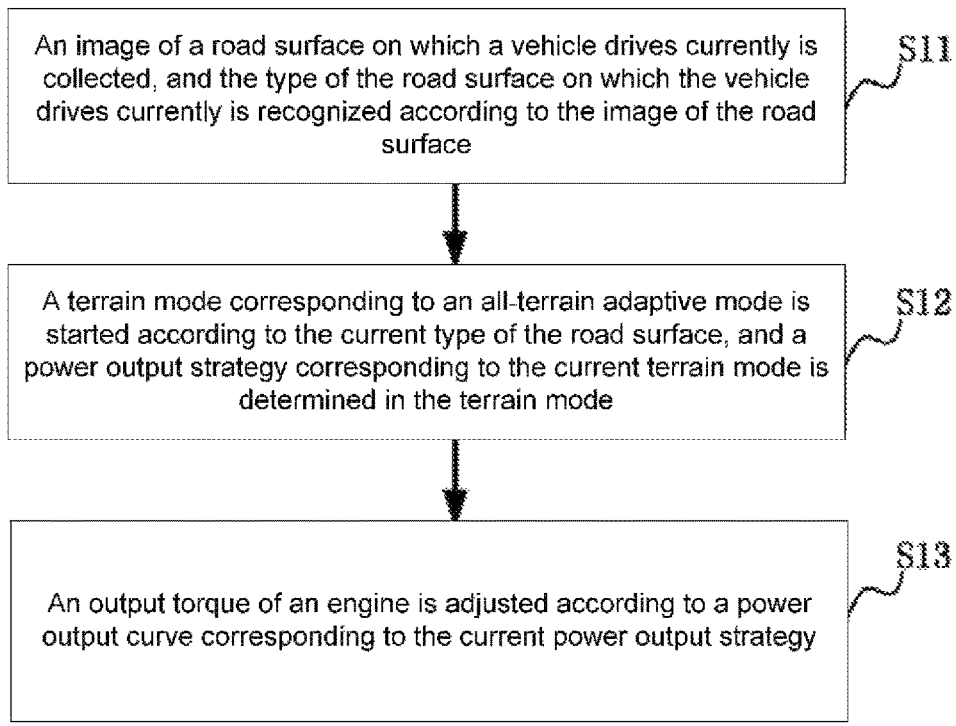
FIG. 1 is a schematic flowchart of a vehicle power output control method according to an embodiment.

FIG. 1 is a schematic flowchart of a vehicle power output control method according to an embodiment. As shown in FIG. 1, the vehicle power output control method in the present embodiment includes the steps as follows.

At step S11, an image of a road surface on which a vehicle drives currently is collected, and the type of the road surface on which the vehicle drives currently is recognized according to the image of the road surface.

In an embodiment, the image of the road surface on which the vehicle drives currently can be collected in real time or periodically by a preset road surface recognition apparatus. Due to different information such as color, pixel and/or contrast of different road surface images, the state of the current road surface can be effectively recognized on the basis of an image analysis algorithm, that is, according to the road surface image, the current road surface can be recognized as a common road surface (including a common urban road surface and a common high-speed road surface), a snowy road surface, a wading road surface or sand (or gravel, etc.).

In another embodiment, the type of the road surface recognized according to the image of the road surface includes at least two of a common type, a snow type, a mud type, and a sand type.

At S12, a terrain mode corresponding to an all-terrain adaptive mode is started according to the current type of the road surface, and a power output strategy corresponding to the current terrain mode is determined in the terrain mode according to a correspondence between each terrain mode in the all-terrain adaptive mode and a preset power output strategy.

The terrain mode in the all-terrain adaptive mode includes at least two of a common terrain mode, a snow mode, a mud mode, and a sand mode.

At S13, an output torque of an engine is adjusted according to a power output curve corresponding to the current power output strategy.

The power output curve is a function curve using a stepping depth of an accelerator pedal as a variable and the output torque of the engine as an output. For example: N=f (Throttle Position), where N represents an output torque of the engine, and Throttle Position represents the stepping depth of the accelerator pedal.

In an embodiment, the vehicle power output control method further includes that: at least two power distribution strategies are preset, and a correspondence between each terrain mode in the all-terrain adaptive mode and the power output strategies is established; and a correspondence between each terrain mode in the all-terrain adaptive mode and the type of a road surface is pre-established. It is to be understood that each terrain mode and the power output strategies may have a one-to-one correspondence, or two or more terrain modes may correspond to one power output strategy. Similarly, the correspondence between the type of a road surface and each terrain mode in the all-terrain adaptive mode may be a one-to-one correspondence, or multiple types of road surfaces correspond to one terrain mode. The above two correspondences can be flexibly adjusted according to actual conditions.

Preferably, various power output strategies may be used for adjusting the output torque of the engine under different conditions by setting a corresponding control program in the existing engine control apparatus of the vehicle and coordinating the corresponding systems/apparatuses through the control program, without adding a corresponding control system.

According to the vehicle power output control method in the above embodiment, an image of a road surface on which a vehicle drives currently is collected, and the type of the road surface on which the vehicle drives currently is recognized according to the image of the road surface; a terrain mode corresponding to an all-terrain adaptive mode is started according to the current type of the road surface; a power output strategy corresponding to the current terrain mode is determined in the terrain mode according to a correspondence between a terrain mode and a preset power output strategy; and an output torque of an engine is adjusted according to a power output curve corresponding to the current power output strategy, the power output curve being a function curve using a stepping depth of an accelerator pedal as a variable and the output torque of the engine as an output. The vehicle can drive on different types of road surfaces with a power adaptive to a current terrain, thereby ensuring that the vehicle can drive on different road surfaces at its best.

In an embodiment, in step S11, a specific manner of recognizing the type of a road surface on which a vehicle drives currently may be: collecting an image of a road surface on which a vehicle drives currently, and analyzing the image of the road surface to obtain road surface state information; acquiring current geographic location Information of the vehicle, and determining a terrain of the current location of the vehicle according to the geographic location information; and recognizing the type of the road surface on which the vehicle drives currently in conjunction with the terrain and the road surface state information. For example, the image of the current road surface is captured by the road surface recognition apparatus, and the current location is positioned according to a GPS or a Plough Satellite Positioning System.

For example, the current road surface of the Hobq Desert may be determined as a sand road surface more accurately in conjunction with the road surface image information captured by the road surface recognition apparatus.

In the above vehicle power output control method, a driver can also manually select the terrain mode. For example, when the image collection apparatus fails, or the current type of the road surface cannot be effectively recognized, the corresponding terrain mode in the all-terrain adaptive mode can be entered according to the terrain mode selected by the driver.

In another embodiment, the vehicle power output control method further includes the steps that: if receiving an operation instruction for selecting a terrain mode, a terrain mode pointed by the operation instruction is compared with a terrain mode corresponding to the currently recognized type of a road surface, if the two are consistent, the terrain mode pointed by the operation Instruction is started, otherwise, the terrain mode corresponding to the currently recognized type of the road surface is started. That is, after the driver manually selects the terrain mode, it is judged whether the terrain mode manually selected by the user is appropriate according to the automatically recognized type of the road surface and its corresponding terrain mode. If not, the terrain mode selected by the user is corrected, thereby avoiding the misoperation of the driver or other people in the vehicle.

In another embodiment, a specific manner of adjusting an output torque of the engine according to different power output curves under different power output strategies may be: acquiring the stepping depth of the accelerator pedal of the vehicle under different power distribution strategies, and calculating an output value of the corresponding power output curve by using the stepping depth as an input parameter, that is, the output torque of the engine. In different power output curves, the correspondence between the output torque of the engine and the accelerator stepping depth is different. In other words, under different power output strategies, even if the stepping depth of the accelerator pedal is the same, the output torque of the engine is different, so power actually obtained by the vehicle is different.

Since the above vehicle power output control method is applicable to a vehicle, which is provided with an all-terrain adaptive mode, in an embodiment, before step S11, the step of starting the all-terrain adaptive mode of the vehicle is further included. For example, the all-terrain adaptive mode is started or closed by a preset control in the vehicle. When the all-terrain adaptive mode is started, the output torque of the engine is controlled in real time in accordance with the above power output control method.

In another embodiment, it is assumed that the all-terrain adaptive mode includes four terrain modes: a common terrain mode, a snow mode, a mud mode and a sand mode. Moreover, the common terrain mode, the snow mode, the muddy water mode and the sand mode are in one-to-one correspondence with a common output strategy, a first output strategy, a second output strategy and a third output strategy, and the corresponding power output strategy may be as shown in Table 1. It can be understood that the terrain mode in the all-terrain adaptive mode includes, but is not limited to, the above four types, and more different terrain modes, such as a rock mode and a grass mode, may be set according to actual conditions. Moreover, the correspondence between the terrain mode in the all-terrain adaptive mode and the power output strategy may also be set according to actual conditions, including but not limited to the above correspondence.

Preferably, a specific manner of implementing step S13 may be as shown in Table

TABLE 1

| All-terrain adaptive mode | Common terrain mode/common output strategy | Adjust an output torque of an engine according to a default power output curve |
|---|---|---|
| | Snow mode/first output strategy | Adjust an output torque of an engine according to power output curve 1 |
| | Mud mode/second output strategy | Adjust an output torque of an engine according to power output curve 2 |
| | Sand mode/third output strategy | Adjust an output torque of an engine according to power output curve 3 |

Figure 2:
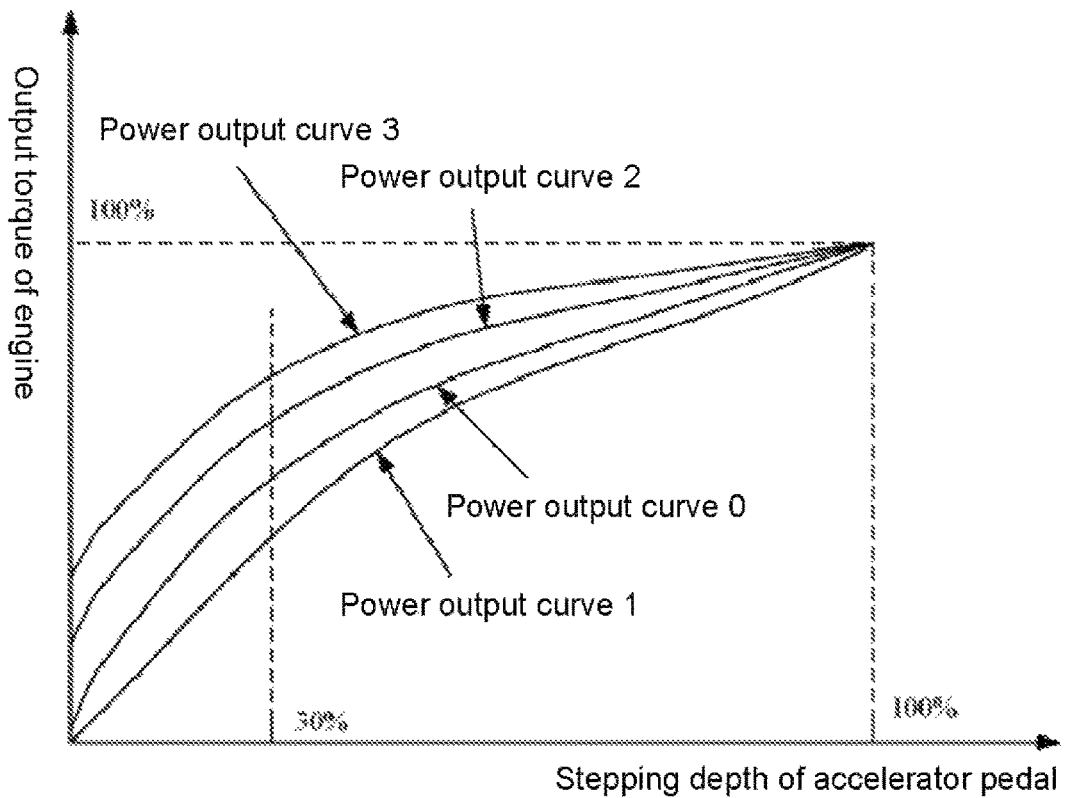
FIG. 2 is a sample diagram of different power output curves of a vehicle power output control method according to an embodiment.

As shown in FIG. 2, a default power output curve (power output curve 0), power output curve 1, power output curve 2, and power output curve 3 are function curves using a stepping depth of an accelerator pedal as a variable and an output torque of the engine as an output. Alternatively, the function curve is a linear function curve, and the overall trend is that the torque output by the engine increases as the stepping depth of the accelerator pedal increases. Preferably, the output torque of the engine corresponding to each power output curve in FIG. 2 is expressed in terms of percentages relative to the current maximum output torque of the engine.

As shown in Table 1 and FIG. 2, a common output strategy is enabled in the common terrain mode of the all-terrain adaptive mode (common urban road or highway), specifically: acquiring the stepping depth of the accelerator pedal, determining an output torque of the engine according to the default power output curve, and controlling the engine to output a torque of the corresponding size through an engine control apparatus. There is no special requirement for the torque output of the engine in the common terrain mode. Refer to the current vehicle engine torque output control strategy.

The corresponding power output strategy is a first output strategy in the snow mode of the all-terrain adaptive mode, specifically: detecting the stepping depth of the accelerator pedal, obtaining an output torque of the engine according to the current stepping depth of the accelerator pedal and a first power output curve (i.e., power output curve 1), and controlling the engine to output a torque of the corresponding size through the engine control apparatus. Referring to FIG. 2, when the stepping depth of the accelerator pedal is the same, the output torque corresponding to the first power output curve is smaller than the output torque corresponding to the default power output curve. That is, in the snow mode, a low-sensitivity pedal curve is used to relatively reduce the engine output torque to prevent the vehicle from starting to slip.

The corresponding power output strategy is a second output strategy in the mud mode of the all-terrain adaptive mode, specifically: detecting the stepping depth of the accelerator pedal, obtaining an output torque of the engine according to the current stepping depth of the accelerator pedal and a second power output curve (i.e., power output curve 2), and controlling the engine to output a torque of the corresponding size through the engine control apparatus. Referring to FIG. 2, when the stepping depth of the accelerator pedal is the same, the output torque corresponding to the second power output curve is greater than the output torque corresponding to the default power output curve. That is, in the mud mode, a high-sensitivity pedal curve is used, so that the engine output torque is stronger than the torque of the low-sensitivity pedal curve at the same throttle depth to improve the vehicle power.

The corresponding power output strategy is a third output strategy in the sand mode of the all-terrain adaptive mode, specifically: detecting the stepping depth of the accelerator pedal, obtaining an output torque of the engine according to the current stepping depth of the accelerator pedal and a third power output curve, and controlling the engine to output a torque of the corresponding size through the engine control apparatus. Referring to FIG. 2, when the stepping depth of the accelerator pedal is the same, the output torque corresponding to the third power output curve (i.e., power output curve 3) is greater than the output torque corresponding to the second power output curve. That is, in the sand mode, a high-sensitivity pedal curve is used, so that the engine output torque is stronger than the torque in the mud mode at the same throttle depth to provide a higher power for the vehicle.

Preferably, various power output strategies may be used for adjusting the output torque of the engine under different conditions by setting a corresponding control program in the existing engine control apparatus of the vehicle and coordinating the corresponding systems/apparatuses through the control program, without adding a corresponding control system.

It is to be noted that, for the foregoing method embodiments, for the sake of brevity, they are all described as a series of action combinations, but those skilled in the art should understand that the present disclosure is not limited by the described action sequence, because certain steps may be performed in other sequences or concurrently in accordance with the present disclosure.

Based on the same idea as the vehicle power output control method in the above embodiment, the present disclosure also provides a vehicle power output control apparatus that can be used to execute the above vehicle power output control method. For the convenience of description, in the schematic structure diagram showing the embodiment of the vehicle power output control apparatus, only the parts related to the embodiment of the present disclosure are shown. Those skilled in the art can understand that the illustrated structure does not constitute a limitation on the apparatus, may include more or fewer parts than shown, or combine some parts, or arrange different parts.

Figure 3:
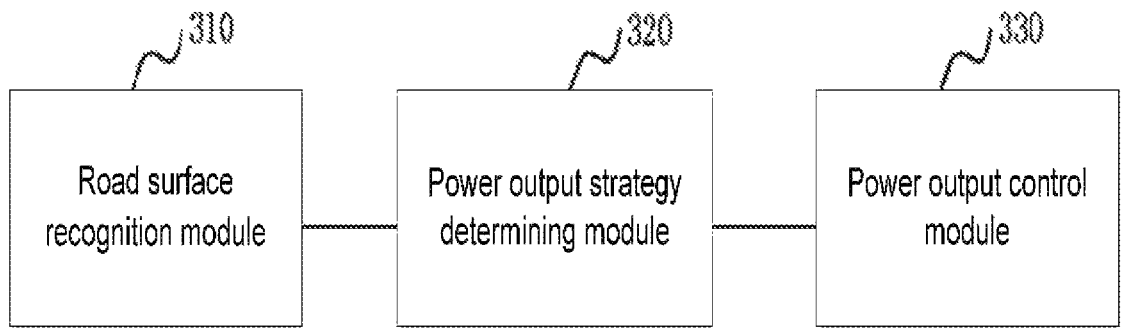
FIG. 3 is a schematic structure diagram of a vehicle power output control apparatus according to an embodiment.

FIG. 3 is a schematic structure diagram of a vehicle power output control apparatus according to an embodiment. As shown in FIG. 3, the vehicle power output control apparatus of the present embodiment includes: a road surface recognition module 310, a power output strategy determining module 320 and a power output control module 330 in detail as follows: The road surface recognition module 310 is configured to collect an image of a road surface on which a vehicle drives currently, and recognize the type of the road surface on which the vehicle drives currently according to the image of the road surface.

The power output strategy determining module 320 is configured to start a terrain mode corresponding to an all-terrain adaptive mode according to the current type of the road surface, and determine a power output strategy corresponding to the current terrain mode according to a correspondence between a terrain mode and a preset power output strategy in the terrain mode, the terrain mode in the all-terrain adaptive mode including at least two of a common terrain mode, a snow mode, a mud mode, and a sand mode.

The power output control module 330 is configured to adjust an output torque of an engine according to a power output curve corresponding to the current power output strategy, the power output curve being a function curve using a stepping depth of an accelerator pedal as a variable and the output torque of the engine as an output.

The power output curve is a function curve using a stepping depth of an accelerator pedal as a variable and the output torque of the engine as an output. For example: N=f(Throttle Position), where N represents an output torque of the engine, and Throttle Position represents the stepping depth of the accelerator pedal.

Alternatively, the function curve is a linear function curve, and the overall trend is that the torque output by the engine increases as the stepping depth of the accelerator pedal increases.

In an embodiment, the vehicle power output control apparatus further includes: a setting module, configured to preset at least two power output strategies, establish a correspondence between each terrain mode in the all-terrain adaptive mode and the power output strategies, and pre-establish a correspondence between each terrain mode in the all-terrain adaptive mode and the type of a road surface.

In an embodiment, the road surface recognition module 310 is specifically configured to: collect an Image of a road surface on which a vehicle drives currently, and analyze the image of the road surface to obtain road surface state information; acquire current geographic location information of the vehicle, and determine a terrain of the current location of the vehicle according to the geographic location information; and recognize the type of the road surface on which the vehicle drives currently in conjunction with the terrain and the road surface state information. The accuracy of road surface type recognition is improved accordingly.

In an embodiment, the power output strategy determining module 320 is further configured to: start, if receiving an operation instruction for selecting a terrain mode, a terrain mode pointed by the operation instruction in the all-terrain mode; or, compare, if receiving the operation instruction for selecting a terrain mode, the terrain mode pointed by the operation instruction with a terrain mode corresponding to the currently recognized type of a road surface, start, if the two are consistent, the terrain mode pointed by the operation instruction, otherwise, start the terrain mode corresponding to the currently recognized type of the road surface, thereby avoiding the misoperation of the driver or other people in the vehicle.

In an embodiment, the correspondence between a terrain mode in the all-terrain adaptive mode and a preset power output strategy is: one-to-one correspondence of a common terrain mode, a snow mode, a muddy water mode and a sand mode with a common output strategy, a first output strategy, a second output strategy and a third output strategy. Alternatively, the power output control module 330 includes a first output control unit, a second output control unit, a third output control unit and a fourth output control unit.

The first output control unit is configured to detect, if it is the common output strategy, the stepping depth of the accelerator pedal, obtain an output torque of the engine according to the current stepping depth of the accelerator pedal and a default power output curve, and control the engine to output a corresponding torque through an engine control apparatus.

The second output control unit is configured to detect, if it is the first output strategy, the stepping depth of the accelerator pedal, obtain an output torque of the engine according to the current stepping depth of the accelerator pedal and a first power output curve, and control the engine to output a corresponding torque through the engine control apparatus.

The third output control unit is configured to detect, if it is the second output strategy, the stepping depth of the accelerator pedal, obtain an output torque of the engine according to the current stepping depth of the accelerator pedal and a second power output curve, and control the engine to output a corresponding torque through the engine control apparatus.

The fourth output control unit is configured to detect, if it is the third output strategy, the stepping depth of the accelerator pedal, obtain an output torque of the engine according to the current stepping depth of the accelerator pedal and a third power output curve, and control the engine to output a corresponding torque through the engine control apparatus.

When the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

According to the vehicle power output control apparatus in the above embodiments, an image of a road surface on which a vehicle drives currently is collected, and the type of the road surface on which the vehicle drives currently is recognized according to the image of the road surface; a terrain mode corresponding to an all-terrain adaptive mode is started according to the current type of the road surface; a power output strategy corresponding to the current terrain mode is determined in the terrain mode according to a correspondence between a terrain mode and a preset power output strategy; and an output torque of an engine is adjusted according to a power output curve corresponding to the current power output strategy, the power output curve being a function curve using a stepping depth of an accelerator pedal as a variable and the output torque of the engine as an output. The vehicle can drive on different road surfaces with a power adaptive to a current terrain, thereby ensuring that the vehicle can drive on different road surfaces at its best.

It is to be noted that since the information interaction, the execution process and the like between the modules/units are based on the same concept as the foregoing method embodiments of the present disclosure in the implementation manner of the vehicle power output control apparatus of the above example, the technical effects are the same as those of the foregoing method embodiments of the present disclosure. Details may refer to the description in the method embodiments of the present disclosure, and the details are not described herein again.

In addition, in the implementation manner of the vehicle power output control apparatus of the above example, the logical division of each functional module is merely an example. During actual application, according to requirements, for example, in view of the configuration requirements of corresponding hardware or the convenience of implementation of software, the above function assignment is performed by different functional modules, that is, the internal structure of the vehicle power output control apparatus is divided into different functional modules to complete all or part of the functions described above. Each functional module/unit can be implemented in the form of hardware or in the form of a software functional module.

Figure 4:
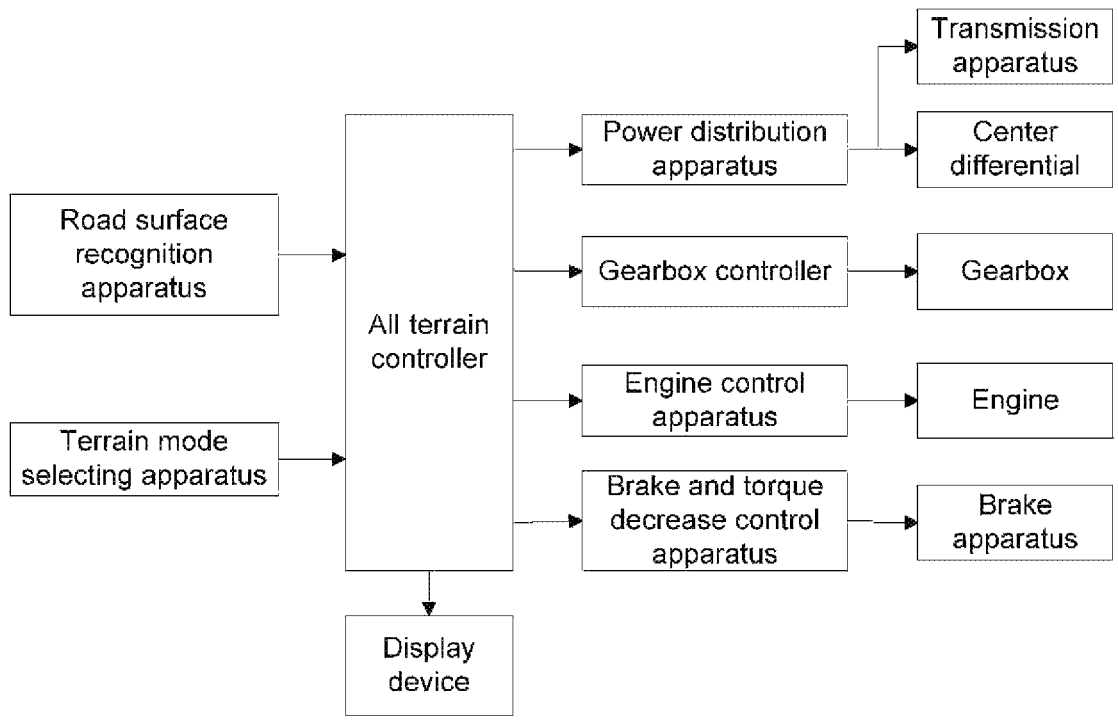
FIG. 4 is a schematic structure diagram of a vehicle power output control system according to an embodiment.

As shown in FIG. 4, it is a schematic structure diagram of a vehicle power output control system according to an embodiment. The vehicle power output control system includes: a road surface recognition apparatus, an all-terrain controller and an engine control apparatus. Referring to FIG. 4, in the vehicle power output control system, the road surface recognition apparatus is connected to the all-terrain controller, the all-terrain controller is further connected to the engine control apparatus, and the engine control apparatus is further connected to an engine. The all-terrain controller includes a separate controller and an integrated controller. The functions implemented by each part are as follows:

The road surface recognition apparatus is configured to collect an image of a road surface on which a vehicle drives currently, recognize the type of the road surface on which the vehicle drives currently according to the image of the road surface, and send the type of the road surface to the all-terrain controller.

The all-terrain controller is configured to start a terrain mode corresponding to an all-terrain adaptive mode according to the current type of the road surface, determine a power output strategy corresponding to the current terrain mode according to a correspondence between a terrain mode and a preset power output strategy in the terrain mode, and send the power output strategy to the engine control apparatus, the terrain mode in the all-terrain adaptive mode including at least two of a common terrain mode, a snow mode, a mud mode, and a sand mode.

The engine control apparatus is configured to adjust an output torque of an engine according to a power output curve corresponding to the current power output strategy, the power output curve being a function curve using a stepping depth of an accelerator pedal as a variable and the output torque of the engine as an output.

In an embodiment, the road surface recognition apparatus includes: an image collection device, a positioning device and a processor. The image collection device is configured to collect an image of a road surface on which a vehicle drives currently, and send the image of the road surface to the processor, the positioning device is configured to acquire current geographic location information of the vehicle, and send the geographic location information to the processor; and the processor is configured to analyze the image of the road surface to obtain road surface state information, determine a terrain of the current location of the vehicle according to the geographic location information, and recognize the type of the road surface on which the vehicle drives currently in conjunction with the terrain and the road surface state information. The accuracy of road surface type recognition is improved.

In an embodiment, the vehicle power output control system further includes: a terrain mode selection apparatus, communicatively connected to the all-terrain controller and configured to receive an operation instruction for selecting a terrain mode and send the operation instruction to the all-terrain controller. For example, a manual mechanical selection apparatus is used to send the selection information of the terrain mode to the all-terrain controller through a hard line/bus manner.

Correspondingly, the all-terrain controller is further configured to: start, if receiving an operation instruction for selecting a terrain mode, a terrain mode pointed by the operation instruction in the all-terrain mode; or, compare, if receiving the operation instruction for selecting a terrain mode, the terrain mode pointed by the operation instruction with a terrain mode corresponding to the currently recognized type of a road surface, start, if the two are consistent, the terrain mode pointed by the operation instruction, otherwise, start the terrain mode corresponding to the currently recognized type of the road surface, thereby avoiding the misoperation of the driver or other people in the vehicle.

In an alternative embodiment, the above vehicle power output control system further includes a display device, communicatively connected to the all-terrain controller. The display device is configured to display prompt information corresponding to the current terrain mode, and display information related to the currently adopted power output strategy to remind the driver of the current terrain mode and the adopted power output strategy.

In an embodiment, the correspondence between each terrain mode in the all-terrain adaptive mode and a power output strategy includes: one-to-one correspondence of a common terrain mode, a snow mode, a muddy water mode and a sand mode with a common output strategy, a first output strategy, a second output strategy and a third output strategy. Alternatively, the engine control apparatus is specifically configured to:

detect, if it is the common output strategy, the stepping depth of the accelerator pedal, obtain an output torque of the engine according to the current stepping depth of the accelerator pedal and a default power output curve, and control the engine to output a corresponding torque; detect, if it is the first output strategy, the stepping depth of the accelerator pedal, obtain an output torque of the engine according to the current stepping depth of the accelerator pedal and a first power output curve, and control the engine to output a corresponding torque; detect, if it is the second output strategy, the stepping depth of the accelerator pedal, obtain an output torque of the engine according to the current stepping depth of the accelerator pedal and a second power output curve, and control the engine to output a corresponding torque; and detect, if it is the third output strategy, the stepping depth of the accelerator pedal, obtain an output torque of the engine according to the current stepping depth of the accelerator pedal and a third power output curve, and control the engine to output a corresponding torque. When the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

In an alternative embodiment, the above vehicle power output control system may further include a power distribution apparatus. The all-terrain controller is also connected to the power distribution apparatus. The power distribution apparatus is also connected to a central differential of the vehicle.

The all-terrain controller is further configured to determine, after starting a terrain mode corresponding to an all-terrain adaptive mode according to the current type of the road surface, a power distribution strategy corresponding to the current terrain mode according to a correspondence between a current terrain mode and a preset power distribution strategy, and send the corresponding power distribution strategy to the power distribution apparatus.

The power distribution apparatus is configured to control the central differential of the vehicle to switch to a locking mode corresponding to the current power distribution strategy under different power distribution strategies, and determine a torque distribution curve corresponding to the current power distribution strategy as a front-rear axle distribution torque of the vehicle. The torque distribution curve is a function curve using a stepping depth of an accelerator pedal as a variable and a torque proportion of a driven axle as an output. For example: T=f (Throttle Position), where T represents the obtained torque proportion of the driven axle (i.e., the proportion of the driven axle to the total output); and Throttle Position represents the stepping depth of the accelerator pedal.

Alternatively, the locking mode of the central differential includes at least a smart control mode, a smart locking mode and a full locking mode. In the smart control mode, the locking degree of the center differential on the front and rear axles is adjusted timely according to the current driving situation, that is, in this mode, the locking degree of the front and rear axles is not fixed, but may change in real time. Differently, the smart locking mode refers to maintaining the central differential at a set locking degree that is less than the maximum locking degree of the center differential on the front and rear axles. In the full locking mode, the center differential maintains the maximum locking degree on the front and rear axles. It is assumed that it is a four-wheel drive vehicle dominated by a front drive. The maximum locking degree of the center differential on the front and rear axles is 100%. When the accelerator pedal is at the maximum stepping depth (i.e., a throttle is fully open), the torque distribution of the front and rear axles is 50% and 50%; correspondingly, in the smart locking mode, the locking degree of the front and rear axles may be 50%, 70%, etc.; if the locking degree of the front and rear axles is 50%, the maximum torque distribution proportion of the front and rear axles may be 75%: 25%; and if the locking degree of the front and rear axles is 70%, the torque distribution proportion of the front and rear axles may be 65%: 35%. It can be seen that for the four-wheel drive vehicle dominated by a front drive, as the locking degree of the center differential on the front and rear axles is higher, the maximum torque obtained by the rear axle is greater, and vice versa, the maximum torque obtained by the rear axle is smaller.

The display device is further configured to display prompt information corresponding to the current power distribution strategy to remind the driver of the currently adopted power distribution strategy.

In an alternative embodiment, the above vehicle power output control system further includes a gearbox controller, the all-terrain controller is further connected to the gearbox controller, and the gearbox controller is connected to a gearbox of the vehicle.

The all-terrain controller is further configured to determine, after starting a terrain mode corresponding to an all-terrain adaptive mode according to the current type of the road surface, a power transmission strategy corresponding to the current terrain mode according to a correspondence between a terrain mode and a preset power transmission mode, and send the corresponding power transmission strategy to the gearbox controller. The gearbox controller is configured to control the gearbox of the vehicle to shift gears according to a gear shift strategy corresponding to the power transmission strategy to adjust a power transmission mechanism of the gearbox.

The display device is further configured to display prompt information corresponding to the current power transmission strategy to remind the driver of the currently adopted power transmission strategy.

On the basis of the vehicle power output control system in the above embodiment, an image of a road surface on which a vehicle drives currently is collected by a road surface recognition apparatus, and the type of the road surface on which the vehicle drives currently is recognized according to the image of the road surface; a terrain mode corresponding to an all-terrain adaptive mode is started according to the current type of the road surface; a power output strategy corresponding to the current terrain mode is determined in the terrain mode according to a correspondence between a terrain mode and a power output strategy; and an output torque of an engine is adjusted according to a power output curve corresponding to the current power output strategy, the power output curve being a function curve using a stepping depth of an accelerator pedal as a variable and the output torque of the engine as an output. The vehicle can drive on different road surfaces with a power adaptive to a current terrain, thereby ensuring that the vehicle can drive on different road surfaces at its best.

In the above embodiment, descriptions of each embodiment are emphasized respectively, and parts which are not elaborated in detail in a certain embodiment may refer to relevant descriptions of other embodiments. It will be understood that the used terms "first", "second" and the like are used herein to distinguish objects, but these objects are not limited by these terms.

Those skilled in the art can understand that all or part of the processes in the above method embodiments may be implemented by a computer program to instruct related hardware, and the program may be stored in a computer readable storage medium as an independent product for sales or use. The program, when executed, may perform all or part of the steps of the embodiments of the methods described above. The storage medium may be a magnetic disk, an optical disk, a Read-Only Memory (ROM), or a Random Access Memory (RAM).

The above embodiments are merely illustrative of several Implementation manners of the present disclosure and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A vehicle power output control method, comprising:
   collecting an image of a road surface on which a vehicle drives currently, and recognizing the type of the road surface on which the vehicle drives currently according to the image of the road surface;
   starting a terrain mode corresponding to an all-terrain adaptive mode according to the current type of the road surface; determining a power output strategy corresponding to the current terrain mode according to a correspondence between a terrain mode and a preset power output strategy, the terrain mode in the all-terrain adaptive mode comprising at least two of a common terrain mode, a snow mode, a mud mode, and a sand mode; and
   adjusting an output torque of an engine according to a power output curve corresponding to the current power output strategy, the power output curve being a function curve using a stepping depth of an accelerator pedal as a variable and the output torque of the engine as an output, for different terrain modes, the correspondence between the output torque of the engine and the stepping depth of the accelerator pedal is different.

2. The vehicle power output control method as claimed in claim 1, further comprising:
   presetting at least two power output strategies, establishing a correspondence between each terrain mode in the all-terrain adaptive mode and the power output strategies, and establishing a correspondence between each terrain mode in the all-terrain adaptive mode and the type of a road surface.

3. The vehicle power output control method as claimed in claim 2, wherein the correspondence between each terrain mode in the all-terrain adaptive mode and a preset power output strategy comprises:
   the common terrain mode, the snow mode, the muddy water mode and the sand mode respectively correspond to a common output strategy, a first output strategy, a second output strategy and a third output strategy;
   adjusting an output torque of an engine according to a power output curve corresponding to the current power output strategy comprises:
   if it is the common output strategy, detecting the stepping depth of the accelerator pedal, obtaining an output torque of the engine according to the current stepping depth of the accelerator pedal and a default power output curve, and controlling the engine to output a corresponding torque through an engine control apparatus;
   if it is the first output strategy, detecting the stepping depth of the accelerator pedal, obtaining an output torque of the engine according to the current stepping depth of the accelerator pedal and a first power output curve, and controlling the engine to output a corresponding torque through the engine control apparatus; and
   if it is the second output strategy, detecting the stepping depth of the accelerator pedal, obtaining an output torque of the engine according to the current stepping depth of the accelerator pedal and a second power output curve, and controlling the engine to output a torque corresponding through the engine control apparatus;
   if it is the third output strategy, detecting the stepping depth of the accelerator pedal, obtaining an output torque of the engine according to the current stepping depth of the accelerator pedal and a third power output curve, and controlling the engine to output a corresponding torque through the engine control apparatus,
   where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

4. The vehicle power output control method as claimed in claim 1, wherein the step of collecting an image of a road surface on which a vehicle drives currently and recognizing the type of the road surface on which the vehicle drives currently according to the image of the road surface comprises:
   collecting an image of a road surface on which a vehicle drives currently, and analyzing the image of the road surface to obtain road surface state information;
   acquiring current geographic location information of the vehicle, and determining a terrain of the current location of the vehicle according to the geographic location information; and
   recognizing the type of the road surface on which the vehicle drives currently in conjunction with the terrain and the road surface state information;
   and/or,
   the vehicle power output control method further comprising the following steps:
   if receiving an operation instruction for selecting a terrain mode, comparing a terrain mode pointed by the operation instruction with a terrain mode corresponding to the currently recognized type of a road surface, if the two are consistent, starting the terrain mode pointed by the operation instruction, otherwise, starting the terrain mode corresponding to the currently recognized type of the road surface.

5. The vehicle power output control method as claimed in claim 4, wherein the correspondence between each terrain mode in the all-terrain adaptive mode and a preset power output strategy comprises:
   the common terrain mode, the snow mode, the muddy water mode and the sand mode respectively correspond to a common output strategy, a first output strategy, a second output strategy and a third output strategy;

adjusting an output torque of an engine according to a power output curve corresponding to the current power output strategy comprises:

if it is the common output strategy, detecting the stepping depth of the accelerator pedal, obtaining an output torque of the engine according to the current stepping depth of the accelerator pedal and a default power output curve, and controlling the engine to output a corresponding torque through an engine control apparatus;

if it is the first output strategy, detecting the stepping depth of the accelerator pedal, obtaining an output torque of the engine according to the current stepping depth of the accelerator pedal and a first power output curve, and controlling the engine to output a corresponding torque through the engine control apparatus; and if it is the second output strategy, detecting the stepping depth of the accelerator pedal, obtaining an output torque of the engine according to the current stepping depth of the accelerator pedal and a second power output curve, and controlling the engine to output a corresponding torque through the engine control apparatus;

if it is the third output strategy, detecting the stepping depth of the accelerator pedal, obtaining an output torque of the engine according to the current stepping depth of the accelerator pedal and a third power output curve, and controlling the engine to output a corresponding torque through the engine control apparatus, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

6. The vehicle power output control method as claimed in claim 1, wherein the correspondence between each terrain mode in the all-terrain adaptive mode and a preset power output strategy comprises:

the common terrain mode, the snow mode, the muddy water mode and the sand mode respectively correspond to a common output strategy, a first output strategy, a second output strategy and a third output strategy;

adjusting an output torque of an engine according to a power output curve corresponding to the current power output strategy comprises:

if it is the common output strategy, detecting the stepping depth of the accelerator pedal, obtaining an output torque of the engine according to the current stepping depth of the accelerator pedal and a default power output curve, and controlling the engine to output a corresponding torque through an engine control apparatus;

if it is the first output strategy, detecting the stepping depth of the accelerator pedal, obtaining an output torque of the engine according to the current stepping depth of the accelerator pedal and a first power output curve, and controlling the engine to output a corresponding torque through the engine control apparatus; and if it is the second output strategy, detecting the stepping depth of the accelerator pedal, obtaining an output torque of the engine according to the current stepping depth of the accelerator pedal and a second power output curve, and controlling the engine to output a corresponding torque through the engine control apparatus;

if it is the third output strategy, detecting the stepping depth of the accelerator pedal, obtaining an output torque of the engine according to the current stepping depth of the accelerator pedal and a third power output curve, and controlling the engine to output a corresponding torque through the engine control apparatus, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

7. A vehicle power output control apparatus, comprising:

a road surface recognition module, configured to collect an image of a road surface on which a vehicle drives currently, and recognize the type of the road surface on which the vehicle drives currently according to the image of the road surface;

a power output strategy determining module, configured to start a terrain mode corresponding to an all-terrain adaptive mode according to the current type of the road surface, and determine a power output strategy corresponding to the current terrain mode according to a correspondence between a terrain mode and a preset power output strategy, the terrain mode in the all-terrain adaptive mode comprising at least two of a common terrain mode, a snow mode, a mud mode, and a sand mode; and a power output control module, configured to adjust an output torque of an engine according to a power output curve corresponding to the current power output strategy, the power output curve being a function curve using a stepping depth of an accelerator pedal as a variable and the output torque of the engine as an output, and for different terrain modes, the correspondence between the output torque of the engine and the stepping depth of the accelerator pedal is different.

8. The vehicle power output control apparatus as claimed in claim 7, further comprising:

a setting module, configured to preset at least two power output strategies, establish a correspondence between each terrain mode in the all-terrain adaptive mode and the power output strategies, and establish a correspondence between each terrain mode in the all-terrain adaptive mode and the recognized type of a road surface.

9. The vehicle power output control apparatus as claimed in claim 8, wherein the correspondence between each terrain mode in the all-terrain adaptive mode and a preset power output strategy comprises:

the common terrain mode, the snow mode, the muddy water mode and the sand mode respectively correspond to a common output strategy, a first output strategy, a second output strategy and a third output strategy;

the power output control module comprises:

a first output control unit, configured to detect, if it is the common output strategy, the stepping depth of the accelerator pedal, obtain an output torque of the engine according to the current stepping depth of the accelerator pedal and a default power output curve, and control the engine to output a corresponding torque through an engine control apparatus;

a second output control unit, configured to detect, if it is the first output strategy, the stepping depth of the accelerator pedal, obtain an output torque of the engine according to the current stepping depth of the accelerator pedal and a first power output curve, and control the engine to output a corresponding torque through the engine control apparatus;

a third output control unit, configured to detect, if it is the second output strategy, the stepping depth of the accelerator pedal, obtain an output torque of the engine according to the current stepping depth of the accelerator pedal and a second power output curve, and control the engine to output a corresponding torque through the engine control apparatus; and a fourth output control unit, configured to detect, if it is the third output strategy, the stepping depth of the accelerator pedal, obtain an output torque of the engine according to the current stepping depth of the accelerator pedal and a third power output curve, and control the engine to output a corresponding torque through the engine control apparatus, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

10. The vehicle power output control apparatus as claimed in claim 7, wherein the road surface recognition module is specifically configured to: collect an image of a road surface on which a vehicle drives currently, and analyze the image of the road surface to obtain road surface state information; acquire current geographic location information of the vehicle, and determine a terrain of the current location of the vehicle according to the geographic location information; and recognize the type of the road surface on which the vehicle drives currently in conjunction with the terrain and the road surface state information;

and/or, the power output strategy determining module is further configured to compare, if receiving an operation instruction for selecting a terrain mode, a terrain mode pointed by the operation instruction with a terrain mode corresponding to the currently recognized type of a road surface, start, if the two are consistent, the terrain mode pointed by the operation instruction, otherwise, start the terrain mode corresponding to the currently recognized type of the road surface.

11. The vehicle power output control apparatus as claimed in claim 10, wherein the correspondence between each terrain mode in the all-terrain adaptive mode and a preset power output strategy comprises:

the common terrain mode, the snow mode, the muddy water mode and the sand mode respectively correspond to a common output strategy, a first output strategy, a second output strategy and a third output strategy;

the power output control module comprises:

a first output control unit, configured to detect, if it is the common output strategy, the stepping depth of the accelerator pedal, obtain an output torque of the engine according to the current stepping depth of the accelerator pedal and a default power output curve, and control the engine to output a corresponding torque through an engine control apparatus;

a second output control unit, configured to detect, if it is the first output strategy, the stepping depth of the accelerator pedal, obtain an output torque of the engine according to the current stepping depth of the accelerator pedal and a first power output curve, and control the engine to output a corresponding torque through the engine control apparatus;

a third output control unit, configured to detect, if it is the second output strategy, the stepping depth of the accelerator pedal, obtain an output torque of the engine according to the current stepping depth of the accelerator pedal and a second power output curve, and control the engine to output a corresponding torque through the engine control apparatus; and a fourth output control unit, configured to detect, if it is the third output strategy, the stepping depth of the accelerator pedal, obtain an output torque of the engine according to the current stepping depth of the accelerator pedal and a third power output curve, and control the engine to output a corresponding torque through the engine control apparatus, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

12. The vehicle power output control apparatus as claimed in claim 7, wherein the correspondence between each terrain mode in the all-terrain adaptive mode and a preset power output strategy comprises:

the common terrain mode, the snow mode, the muddy water mode and the sand mode respectively correspond to a common output strategy, a first output strategy, a second output strategy and a third output strategy;

the power output control module comprises:

a first output control unit, configured to detect, if it is the common output strategy, the stepping depth of the accelerator pedal, obtain an output torque of the engine according to the current stepping depth of the accelerator pedal and a default power output curve, and control the engine to output a corresponding torque through an engine control apparatus;

a second output control unit, configured to detect, if it is the first output strategy, the stepping depth of the accelerator pedal, obtain an output torque of the engine according to the current stepping depth of the accelerator pedal and a first power output curve, and control the engine to output a corresponding torque through the engine control apparatus;

a third output control unit, configured to detect, if it is the second output strategy, the stepping depth of the accelerator pedal, obtain an output torque of the engine according to the current stepping depth of the accelerator pedal and a second power output curve, and control the engine to output a corresponding torque through the engine control apparatus; and a fourth output control unit, configured to detect, if it is the third output strategy, the stepping depth of the accelerator pedal, obtain an output torque of the engine according to the current stepping depth of the accelerator pedal and a third power output curve, and control the engine to output a corresponding torque through the engine control apparatus, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

13. A vehicle power output control system, comprising: a road surface recognition apparatus, an all-terrain controller and an engine control apparatus, wherein the road surface recognition apparatus is configured to collect an image of a road surface on which a vehicle drives currently, recognize the type of the road surface on which the vehicle drives currently according to the image of the road surface, and send the type of the road surface to the all-terrain controller;

the all-terrain controller is configured to start a terrain mode corresponding to an all-terrain adaptive mode according to the current type of the road surface, determine a power output strategy corresponding to the current terrain mode according to a correspondence between a terrain mode and a preset power output strategy, and send the power output strategy to the engine control apparatus, the terrain mode in the all-terrain adaptive mode comprising at least two of a common terrain mode, a snow mode, a mud mode, and a sand mode; and the engine control apparatus is configured to adjust an output torque of an engine according to a power output curve corresponding to the current power output strategy, the power output curve being a function curve using a stepping depth of an accelerator pedal as a variable and the output torque of the engine as an output, and for different terrain modes, the correspondence between the output torque of the engine and the stepping depth of the accelerator pedal is different.

14. The vehicle power output control system as claimed in claim 13, wherein the road surface recognition apparatus comprises: an image collection device, a positioning device and a processor;

the image collection device is configured to collect an image of a road surface on which a vehicle drives currently, and send the image of the road surface to the processor;

the positioning device is configured to acquire current geographic location information of the vehicle, and send the geographic location information to the processor; and the processor is configured to analyze the image of the road surface to obtain road surface state information, determine a terrain of the current location of the vehicle according to the geographic location information, and recognize the type of the road surface on which the vehicle drives currently in conjunction with the terrain and the road surface state information;

and/or, the vehicle power output control system further comprises: a terrain mode selecting apparatus, the terrain mode selecting apparatus being configured to receive an operation instruction for selecting a terrain mode, and send the operation instruction to the all-terrain controller; and the all-terrain controller is further configured to compare, if receiving the operation instruction for selecting a terrain mode, a terrain mode pointed by the operation instruction with a terrain mode corresponding to the currently recognized type of a road surface, if the two are consistent, start the terrain mode pointed by the operation instruction, otherwise, start the terrain mode corresponding to the currently recognized type of the road surface.

15. The vehicle power output control system as claimed in claim 14, wherein the correspondence between each terrain mode in the all-terrain adaptive mode and a power output strategy comprises:

the common terrain mode, the snow mode, the muddy water mode and the sand mode respectively correspond to a common output strategy, a first output strategy, a second output strategy and a third output strategy; and the engine control apparatus is configured to:

detect, if it is the common output strategy, the stepping depth of the accelerator pedal, obtain an output torque of the engine according to the current stepping depth of the accelerator pedal and a default power output curve, and control the engine to output a corresponding torque;

detect, if it is the first output strategy, the stepping depth of the accelerator pedal, obtain an output torque of the engine according to the current stepping depth of the accelerator pedal and a first power output curve, and control the engine to output a corresponding torque;

detect, if it is the second output strategy, the stepping depth of the accelerator pedal, obtain an output torque of the engine according to the current stepping depth of the accelerator pedal and a second power output curve, and control the engine to output a corresponding torque; and detect, if it is the third output strategy, the stepping depth of the accelerator pedal, obtain an output torque of the engine according to the current stepping depth of the accelerator pedal and a third power output curve, and control the engine to output a corresponding torque, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

16. The vehicle power output control system as claimed in claim 13, wherein the correspondence between each terrain mode in the all-terrain adaptive mode and a power output strategy comprises:

the common terrain mode, the snow mode, the muddy water mode and the sand mode respectively correspond to a common output strategy, a first output strategy, a second output strategy and a third output strategy; and the engine control apparatus is configured to:

detect, if it is the common output strategy, the stepping depth of the accelerator pedal, obtain an output torque of the engine according to the current stepping depth of the accelerator pedal and a default power output curve, and control the engine to output a corresponding torque;

detect, if it is the first output strategy, the stepping depth of the accelerator pedal, obtain an output torque of the engine according to the current stepping depth of the accelerator pedal and a first power output curve, and control the engine to output a corresponding torque;

detect, if it is the second output strategy, the stepping depth of the accelerator pedal, obtain an output torque of the engine according to the current stepping depth of the accelerator pedal and a second power output curve, and control the engine to output a corresponding torque; and detect, if it is the third output strategy, the stepping depth of the accelerator pedal, obtain an output torque of the engine according to the current stepping depth of the accelerator pedal and a third power output curve, and control the engine to output a corresponding torque, where when the stepping depth of the accelerator pedal is the same, the output torque corresponding to the first power output curve is smaller than the output torque corresponding to the default power output curve, the output torque corresponding to the second power output curve is greater than the output torque corresponding to the default power output curve, and the output torque corresponding to the third power output curve is greater than the output torque corresponding to the second power output curve.

\* \* \* \* \*